United States Patent
Deng et al.

(10) Patent No.: US 12,341,648 B2
(45) Date of Patent: Jun. 24, 2025

(54) MASTER/BACKUP NEGOTIATION METHOD AND DEVICE

(71) Applicant: Huawei Technologies Co., Ltd., Shenzhen (CN)

(72) Inventors: Li Deng, Beijing (CN); Jingjing Bao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/343,418

(22) Filed: Jun. 28, 2023

(65) Prior Publication Data

US 2023/0344702 A1    Oct. 26, 2023

Related U.S. Application Data

(63) Continuation of application No. PCT/CN2021/142062, filed on Dec. 28, 2021.

(30) Foreign Application Priority Data

Dec. 29, 2020 (CN) .......................... 202011602853.4

(51) Int. Cl.
H04L 41/0663 (2022.01)
(52) U.S. Cl.
CPC ................ *H04L 41/0663* (2013.01)
(58) Field of Classification Search
None
See application file for complete search history.

(56) References Cited

U.S. PATENT DOCUMENTS

| | | | | |
|---|---|---|---|---|
| 2004/0013118 A1* | 1/2004 | Borella | ............... | H04L 12/4633 370/395.2 |
| 2005/0237926 A1* | 10/2005 | Cheng | ..................... | H04L 43/10 370/216 |
| 2013/0094350 A1* | 4/2013 | Mandal | .................. | H04L 45/28 370/400 |
| 2018/0331921 A1* | 11/2018 | Lin | ...................... | H04L 63/0263 |
| 2019/0173739 A1* | 6/2019 | Cui | .......................... | H04L 45/02 |
| 2019/0222434 A1* | 7/2019 | Ye | ........................ | H04L 61/5014 |

(Continued)

FOREIGN PATENT DOCUMENTS

| | | | |
|---|---|---|---|
| CN | 109889390 A | 6/2019 |
| EP | 2992644 B1 | 9/2018 |

(Continued)

OTHER PUBLICATIONS

Song et al., CN-112511326-A; foreign application # CN 202010182757.2, filed on Mar. 16, 2020; original publication in Chinese; retrieved on Dec. 28, 2023 from PE2E-Search. (Year: 2020).*

(Continued)

*Primary Examiner* — Sandarva Khanal
(74) *Attorney, Agent, or Firm* — Slater Matsil, LLP

(57) ABSTRACT

A network system comprises a first control unit, a second control unit, and a subscriber unit. The first control unit periodically sends a heartbeat message to the subscriber unit. the subscriber unit forwards received heartbeat messages to a second control unit. The second control unit makes a master/backup decision based on the heartbeat messages and whether a heartbeat message is received in a respective period.

9 Claims, 5 Drawing Sheets

(56) References Cited

U.S. PATENT DOCUMENTS

2019/0363927 A1* 11/2019 Ganeriwal .............. H04L 45/58
2020/0204485 A1*  6/2020 Singh ...................... H04L 45/38
2021/0194788 A1*  6/2021 Liu ......................... H04L 12/28
2023/0132861 A1*  5/2023 Song ...................... H04L 45/28
                                                              709/224

FOREIGN PATENT DOCUMENTS

WO    WO-2014071605 A1 *  5/2014   ......... H04L 41/5041
WO    WO-2018041152 A1 *  3/2018   ........... H04L 12/287

OTHER PUBLICATIONS

Hu, S. et al., "RFC 8772, The China Mobile, Huawei, and ZTE Broadband Network Gateway (BNG) Simple Control and UserPlane Separation Protocol (S-CUSP)," May 2020, 124 pages.

S. Hu et al, Requirements for Control Plane and User Plane Separated BNG Protocol, rtgwg Internet-Draft, Oct. 22, 2018, 12 pages.

Request for Comments: 8772, S. Hu et al, The China Mobile, Huawei, and ZTE Broadband Network Gateway (BNG) Simple, Control and User Plane Separation Protocol (S-CUSP), May 2020, 65 pages.

* cited by examiner

MASTER/BACKUP NEGOTIATION METHOD AND DEVICE

CROSS-REFERENCE TO RELATED APPLICATIONS

This application is a continuation of International Application No. PCT/CN2021/142062, filed on Dec. 28, 2021, which claims priority to Chinese Patent Application No. 202011602853.4, filed on Dec. 29, 2020. The disclosures of the aforementioned applications are hereby incorporated by reference in their entireties.

TECHNICAL FIELD

Embodiments of this application relate to the communication field, and in particular, to a master/backup negotiation method and a device.

BACKGROUND

A broadband network gateway (BNG) device is very important in a user broadband access service and scenario, and has main functions such as user authentication, access control, and traffic scheduling. With development of various internet services, a quantity of user sessions supported by the BNG is increasing, and user access bandwidth is also increasing. The BNG device needs to improve performance of the BNG device by decoupling forwarding and control, to meet requirements of the internet development. Therefore, a control plane and user plane separation architecture-based BNG device is widely used.

Currently, the control plane and user plane separation architecture-based BNG device includes a control plane (CP) and a user plane (UP) (or referred to as a forwarding plane). A home gateway may send a dial-up request to the UP, so that the UP can go online. After the UP goes online, the home gateway may send service data to the UP, and the UP forwards the service data to the CP, so that the CP accesses a service of the home gateway. One CP may be connected to a plurality of UPs, to separately access services of a plurality of home gateways. If the CP is faulty, the services of the plurality of home gateways cannot be accessed. Therefore, in the control plane and user plane separation architecture-based BNG device, a master CP and a backup CP are usually set, to improve reliability of the BNG device. The UP may separately forward the service data of the home gateway to the master CP and the backup CP. The master CP is responsible for service access of the home gateway, and the backup CP is responsible for service data backup. Master/backup negotiation may be performed between the master CP and the backup CP by using a heartbeat message, so that when the master CP is faulty, the service access of the home gateway can be performed by the backup CP. For example, the backup CP determines whether the master CP is faulty by determining whether the heartbeat message from the master CP is received. When the backup CP determines that the master CP is faulty, the backup CP performs the service access of the home gateway in place of the master CP.

However, in the foregoing BNG device, if a channel used to transmit the heartbeat message between the master CP and the backup CP is faulty, the backup CP determines that the master CP is faulty because the backup CP cannot receive the heartbeat message, and starts to perform the service access operation of the home gateway. As a result, a dual-master problem that both the master CP and the backup CP perform the service access of the home gateway occurs, causing a service access conflict.

SUMMARY

Embodiments of this application provide a master/backup negotiation method and a device, to resolve a problem that a service access conflict is caused when both a master CP and a backup CP perform service access of a home gateway.

To achieve the foregoing objective, the following technical solutions are used in embodiments of this application.

According to a first aspect, an embodiment of this application provides a master/backup negotiation method. The method may be applied to a first control unit in a network system, and the network system may further include a second control unit and at least one subscriber unit. The first control unit establishes a communication connection to the subscriber unit, and the second control unit establishes a communication connection to the subscriber unit. The method may include:

The first control unit generates a heartbeat message by using a communication protocol between the first control unit and the subscriber unit. Then, the first control unit sends the heartbeat message to the subscriber unit. The heartbeat message may be sent by the subscriber unit to the second control unit, to be used by the second control unit to make a master/backup decision.

Based on the method in the first aspect, the first control unit and the second control unit may forward, by using the subscriber unit, the heartbeat message sent by a master control unit (for example, the first control unit). Generally, there are a plurality of subscriber units. When a specific subscriber unit is faulty, a backup control unit (for example, the second control unit) may still receive a heartbeat message forwarded by another subscriber unit. In this way, the following dual-master problem that when the first control unit and the second control unit are directly connected in communication to send the heartbeat message, because a communication channel is faulty, the backup control unit (for example, the second control unit) misjudges that the master control unit (for example, the first control unit) is faulty because the backup control unit fails to receive the heartbeat message, and starts to perform service access of a newly-accessed home gateway and perform service continuation of an already-accessed home gateway can be avoided.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a control plane and user plane separation protocol (CUSP) message. Based on this possible design, the heartbeat message is transmitted by using a protocol channel that has been established between the control unit and the subscriber unit. This can simplify system design and facilitate implementation.

In a possible design, the CUSP message may include a first field and a second field. The first field may indicate that a message type of the CUSP message is the heartbeat message, and the second field may indicate master/backup states of the first control unit and the second control unit. Based on this possible design, the set first field can enable the backup control unit (for example, the second control unit) that receives the heartbeat message to determine that the message is the heartbeat message. The set second field can enable the second control unit to determine, after receiving the heartbeat message, the master/backup state of the second control unit, that is, make the master/backup decision.

In a possible design, the second field may be a priority of the first control unit. Based on this possible design, the master/backup states of the first control unit and the second control unit are indicated by using the priority. This facilitates implementation and simplifies system design.

In a possible design, the CUSP message may further include a third field. The third field may indicate a user group corresponding to the master/backup state. Based on this possible design, when the master/backup states of the first control unit and the second control unit are separately set based on a user group including different subscriber units, different subscriber unit groups, different interfaces of a subscriber unit, and the like, after receiving the heartbeat message, the second control unit can determine, based on the indication of the third field, that master/backup negotiation is to be performed on which subscriber units, subscriber unit groups, or interfaces of a subscriber unit.

In a possible design, the third field may be an identifier of the user group. For example, the identifier of the user group may be an identifier of a subscriber unit corresponding to the master/backup state, an identifier of a subscriber unit group corresponding to the master/backup state, an identifier of an interface of a subscriber unit corresponding to the master/backup state, or the like.

According to a second aspect, an embodiment of this application provides a network device. The network device may be used in a network system that includes a first control unit, a second control unit, and a subscriber unit. The first control unit and the second control unit are separately connected to the subscriber unit. The network device is the first control unit, and may implement functions performed by the first control unit according to the first aspect or the possible design of the first aspect. The functions may be implemented by hardware, or may be implemented by hardware executing corresponding software. The hardware or software includes one or more modules corresponding to the foregoing functions. For example, the network device may include a generation module, a sending module, and the like.

The generation module may be configured to generate a heartbeat message by using a communication protocol between the first control unit and the subscriber unit. The sending module may be configured to send the heartbeat message to the subscriber unit. The heartbeat message may be sent by the subscriber unit to the second control unit, to be used by the second control unit to make a master/backup decision.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a CUSP message.

In a possible design, the CUSP message may include a first field and a second field. The first field may indicate that a message type of the CUSP message is the heartbeat message, and the second field may indicate master/backup states of the first control unit and the second control unit.

In a possible design, the second field may be a priority of the first control unit.

In a possible design, the CUSP message may further include a third field. The third field may indicate a user group corresponding to the master/backup state.

In a possible design, the third field may be an identifier of the user group.

According to a third aspect, an embodiment of this application provides a network device. The network device may be used in a network system that includes a first control unit, a second control unit, and a subscriber unit. The first control unit and the second control unit are separately connected to the subscriber unit. The network device is the first control unit, and may include a processor and a memory. The memory is configured to store computer-executable instructions. When the network device runs, the processor executes the computer-executable instructions stored in the memory, so that the network device performs the master/backup negotiation method according to any one of the first aspect or the possible designs of the first aspect.

According to a fourth aspect, an embodiment of this application provides a computer-readable storage medium. The computer-readable storage medium stores instructions, and when the instructions are run on a computer, the computer is enabled to perform the master/backup negotiation method according to any one of the first aspect or the possible designs of the foregoing aspect.

According to a fifth aspect, an embodiment of this application provides a computer program product including instructions. When the computer program product is run on a computer, the computer is enabled to perform the master/backup negotiation method according to any one of the first aspect or the possible designs of the first aspect.

According to a sixth aspect, an embodiment of this application provides a chip system. The chip system may include a processor and a transceiver, configured to support the first control unit in implementing the function according to any one of the first aspect or the possible designs of the first aspect. In a possible design, the chip system further includes a memory, and the memory is configured to store program instructions and data that are necessary for the first control unit. The chip system may include a chip, or may include a chip and another discrete component.

For technical effects achieved by any one of the designs of the second aspect to the sixth aspect, refer to the technical effects achieved by any one of the first aspect or the possible designs of the first aspect. Details are not described again.

According to a seventh aspect, an embodiment of this application provides another master/backup negotiation method. The method may be applied to a subscriber unit in a network system, and the network system may further include a second control unit and at least one subscriber unit. The first control unit establishes a communication connection to the subscriber unit, and the second control unit establishes a communication connection to the subscriber unit. The method may include:

When the first control unit sends a heartbeat message to the subscriber unit, the subscriber unit receives the heartbeat message from the first control unit. Then, the subscriber unit sends the heartbeat message to the second control unit, so that the second control unit makes a master/backup decision based on the heartbeat message.

Based on the method in the seventh aspect, the first control unit and the second control unit may forward, by using the subscriber unit, the heartbeat message sent by a master control unit (for example, the first control unit). Generally, there are a plurality of subscriber units. When a specific subscriber unit is faulty, a backup control unit (for example, the second control unit) may still receive a heartbeat message forwarded by another subscriber unit. In this way, the following dual-master problem that when the first control unit and the second control unit are directly connected in communication to send the heartbeat message, because a communication channel is faulty, the backup control unit (for example, the second control unit) misjudges that the master control unit (for example, the first control unit) is faulty because the backup control unit fails to receive the heartbeat message, and starts to perform service access of a newly-accessed home gateway and perform service continuation of an already-accessed home gateway can be avoided.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a CUSP message. Based on this possible design, the heartbeat message is transmitted by using a protocol channel that has been established between the control unit and the subscriber unit. This can simplify system design and facilitate implementation.

In a possible design, the CUSP message may include a first field and a second field. The first field may indicate that a message type of the CUSP message is the heartbeat message, and the second field may indicate master/backup states of the first control unit and the second control unit. Based on this possible design, the set first field can enable the backup control unit (for example, the second control unit) that receives the heartbeat message to determine that the message is the heartbeat message. The set second field can enable the second control unit to determine, after receiving the heartbeat message, the master/backup state of the second control unit, that is, make the master/backup decision.

In a possible design, the second field may be a priority of the first control unit. Based on this possible design, the master/backup states of the first control unit and the second control unit are indicated by using the priority. This facilitates implementation and simplifies system design.

In a possible design, the CUSP message may further include a third field. The third field may indicate a user group corresponding to the master/backup state. Based on this possible design, when the master/backup states of the first control unit and the second control unit are separately set based on a user group including different subscriber units, different subscriber unit groups, different interfaces of a subscriber unit, and the like, after receiving the heartbeat message, the second control unit can determine, based on the indication of the third field, that master/backup negotiation is to be performed on which subscriber units, subscriber unit groups, or interfaces of a subscriber unit.

In a possible design, the third field may be an identifier of the user group. For example, the identifier of the user group may be an identifier of a subscriber unit corresponding to the master/backup state, an identifier of a subscriber unit group corresponding to the master/backup state, an identifier of an interface of a subscriber unit corresponding to the master/backup state, or the like.

According to an eighth aspect, an embodiment of this application provides a network device. The network device may be used in a network system that includes a first control unit, a second control unit, and a subscriber unit. The first control unit and the second control unit are separately connected to the subscriber unit. The network device is the subscriber unit, and may implement functions performed by the subscriber unit according to the seventh aspect or the possible design of the seventh aspect. The functions may be implemented by hardware, or may be implemented by hardware executing corresponding software. The hardware or software includes one or more modules corresponding to the foregoing functions. For example, the network device may include a sending module, a receiving module, and the like.

The receiving module may be configured to: when the first control unit sends a heartbeat message, receive the heartbeat message from the first control unit. The sending module may be configured to send the heartbeat message to the second control unit, so that the second control unit may make a master/backup decision based on the heartbeat message.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a CUSP message.

In a possible design, the CUSP message may include a first field and a second field. The first field may indicate that a message type of the CUSP message is the heartbeat message, and the second field may indicate master/backup states of the first control unit and the second control unit.

In a possible design, the second field may be a priority of the first control unit.

In a possible design, the CUSP message may further include a third field. The third field may indicate a user group corresponding to the master/backup state.

In a possible design, the third field may be an identifier of the user group.

According to a ninth aspect, an embodiment of this application provides a network device. The network device may be used in a network system that includes a first control unit, a second control unit, and a subscriber unit. The first control unit and the second control unit are separately connected to the subscriber unit. The network device is the subscriber unit, and may include a processor and a memory. The memory is configured to store computer-executable instructions. When the network device runs, the processor executes the computer-executable instructions stored in the memory, so that the network device performs the master/backup negotiation method according to any one of the seventh aspect or the possible designs of the seventh aspect.

According to a tenth aspect, an embodiment of this application provides a computer-readable storage medium. The computer-readable storage medium stores instructions, and when the instructions are run on a computer, the computer is enabled to perform the master/backup negotiation method according to any one of the seventh aspect or the possible designs of the foregoing aspect.

According to an eleventh aspect, an embodiment of this application provides a computer program product including instructions. When the computer program product is run on a computer, the computer is enabled to perform the master/backup negotiation method according to any one of the seventh aspect or the possible designs of the seventh aspect.

According to a twelfth aspect, an embodiment of this application provides a chip system. The chip system may include a processor and a transceiver, configured to support the subscriber unit in implementing the function according to any one of the seventh aspect or the possible designs of the seventh aspect. In a possible design, the chip system further includes a memory, and the memory is configured to store program instructions and data that are necessary for the subscriber unit. The chip system may include a chip, or may include a chip and another discrete component.

For technical effects achieved by any one of the designs of the eighth aspect to the twelfth aspect, refer to the technical effects achieved by any one of the seventh aspect or the possible designs of the seventh aspect. Details are not described again.

According to a thirteenth aspect, an embodiment of this application provides still another master/backup negotiation method. The method may be applied to a second control unit in a network system, and the network device further includes a first control unit and at least one subscriber unit. The first control unit establishes a communication connection to the subscriber unit, and the second control unit establishes a communication connection to the subscriber unit. The method may include:

When the subscriber unit sends a heartbeat message to the second control unit, the second control unit receives the heartbeat message from the subscriber unit. Then, the second control unit makes a master/backup decision based on the heartbeat message.

Based on the method in the thirteenth aspect, the first control unit and the second control unit may forward, by using the subscriber unit, the heartbeat message sent by a master control unit (for example, the first control unit). Generally, there are a plurality of subscriber units. When a specific subscriber unit is faulty, a backup control unit (for example, the second control unit) may still receive a heartbeat message forwarded by another subscriber unit. In this way, the following dual-master problem that when the first control unit and the second control unit are directly connected in communication to send the heartbeat message, because a communication channel is faulty, the backup control unit (for example, the second control unit) misjudges that the master control unit (for example, the first control unit) is faulty because the backup control unit fails to receive the heartbeat message, and starts to perform service access of a newly-accessed home gateway and perform service continuation of an already-accessed home gateway can be avoided.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a CUSP message. Based on this possible design, the heartbeat message is transmitted by using a protocol channel that has been established between the control unit and the subscriber unit. This can simplify system design and facilitate implementation.

In a possible design, the CUSP message may include a first field and a second field. The first field may indicate that a message type of the CUSP message is the heartbeat message, and the second field may indicate master/backup states of the first control unit and the second control unit. Based on this possible design, the set first field can enable the backup control unit (for example, the second control unit) that receives the heartbeat message to determine that the message is the heartbeat message. The set second field can enable the second control unit to determine, after receiving the heartbeat message, the master/backup state of the second control unit, that is, make the master/backup decision.

In a possible design, the second field may be a priority of the first control unit. A processing module may be specifically configured to make the master/backup decision based on the priority of the first control unit and a priority of the second control unit. Based on this possible design, the master/backup states of the first control unit and the second control unit are indicated by using the priority. This facilitates implementation and simplifies system design.

In a possible design, the CUSP message may further include a third field. The third field may indicate a user group corresponding to the master/backup state. Based on this possible design, when the master/backup states of the first control unit and the second control unit are separately set based on a user group including different subscriber units, different subscriber unit groups, different interfaces of a subscriber unit, and the like, after receiving the heartbeat message, the second control unit can determine, based on the indication of the third field, that master/backup negotiation is to be performed on which subscriber units, subscriber unit groups, or interfaces of a subscriber unit.

In a possible design, the third field may be an identifier of the user group. For example, the identifier of the user group may be an identifier of a subscriber unit corresponding to the master/backup state, an identifier of a subscriber unit group corresponding to the master/backup state, an identifier of an interface of a subscriber unit corresponding to the master/backup state, or the like.

According to a fourteenth aspect, an embodiment of this application provides a network device. The network device may be used in a network system that includes a first control unit, a second control unit, and a subscriber unit. The first control unit and the second control unit are separately connected to the subscriber unit. The network device is the second control unit, and may implement functions performed by the second control unit according to the thirteenth aspect or the possible design of the thirteenth aspect. The functions may be implemented by hardware, or may be implemented by hardware executing corresponding software. The hardware or software includes one or more modules corresponding to the foregoing functions. For example, the network device may include a receiving module, a processing module, and the like.

The receiving module may be configured to: when the subscriber unit sends a heartbeat message, receive the heartbeat message from the subscriber unit. The processing module may be configured to make a master/backup decision based on the heartbeat message.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a CUSP message.

In a possible design, the CUSP message may include a first field and a second field, where the first field indicates that a message type of the CUSP message is the heartbeat message, and the second field indicates master/backup states of the first control unit and the second control unit.

In a possible design, the second field may be a priority of the first control unit.

In a possible design, the CUSP message further includes a third field, and the third field may indicate a user group corresponding to the master/backup state.

In a possible design, the third field may be an identifier of the user group.

According to a fifteenth aspect, an embodiment of this application provides a network device. The network device may be used in a network system that includes a first control unit, a second control unit, and a subscriber unit. The first control unit and the second control unit are separately connected to the subscriber unit. The network device is the second control unit, and may include a processor and a memory. The memory is configured to store computer-executable instructions. When the network device runs, the processor executes the computer-executable instructions stored in the memory, so that the network device performs the master/backup negotiation method according to any one of the thirteenth aspect or the possible designs of the thirteenth aspect.

According to a sixteenth aspect, an embodiment of this application provides a computer-readable storage medium. The computer-readable storage medium stores instructions, and when the instructions are run on a computer, the computer is enabled to perform the master/backup negotiation method according to any one of the thirteenth aspect or the possible designs of the foregoing aspect.

According to a seventeenth aspect, an embodiment of this application provides a computer program product including instructions. When the computer program product is run on a computer, the computer is enabled to perform the master/backup negotiation method according to any one of the thirteenth aspect or the possible designs of the thirteenth aspect.

According to an eighteenth aspect, an embodiment of this application provides a chip system. The chip system may include a processor and a transceiver, configured to support the second control unit in implementing the function in any one of the thirteenth aspect or the possible designs of the thirteenth aspect. In a possible design, the chip system further includes a memory, and the memory is configured to store program instructions and data that are necessary for the second control unit. The chip system may include a chip, or may include a chip and another discrete component.

For technical effects achieved by any one the designs of the fourteenth aspect to the eighteenth aspect, refer to the technical effects achieved by any one of the thirteenth aspect or the possible designs of the thirteenth aspect. Details are not described again.

According to a nineteenth aspect, an embodiment of this application provides a network system. The network system may include a first control unit, a second control unit, and at least one subscriber unit. The first control unit and the second control unit are separately connected to the subscriber unit. The first control unit may send, to the subscriber unit, a heartbeat message that indicates the second control unit to make a master/backup decision. After receiving the heartbeat message, the subscriber unit may send the received heartbeat message to the second control unit. Then, the second control unit may make the master/backup decision based on the received heartbeat message.

In a possible design, the first control unit and the second control unit each may include at least one of a control plane (CP), a virtual control plane (VCP), a virtual broadband network gateway control plane (VBNG-CP), or the like. The subscriber unit may include at least one of a user plane (UP), a virtual user plane (VUP), a virtual broadband network gateway user plane (VBNG-UP), or the like. For example, the first control unit is a first CP, the second control unit is a second CP, and the subscriber unit is a UP.

In a possible design, the heartbeat message may be a CUSP message.

In a possible design, the CUSP message may include a first field and a second field, where the first field indicates that a message type of the CUSP message is the heartbeat message, and the second field indicates master/backup states of the first control unit and the second control unit.

In a possible design, the second field may be a priority of the first control unit.

In a possible design, the CUSP message may further include a third field, and the third field indicates a user group corresponding to the master/backup state.

In a possible design, the third field may be an identifier of the user group.

For technical effects achieved by any one of the designs of the nineteenth aspect, refer to technical effects achieved by any one of the possible designs of the first aspect, the seventh aspect, and the thirteenth aspect. Details are not described again.

DETAILED DESCRIPTION OF ILLUSTRATIVE EMBODIMENTS

With development of a software-defined network (SDN) technology and a network functions virtualization (NFV) technology, a metropolitan area network evolves from a traditional network-centric architecture to a data center-centric architecture. A traditional network device has evolved from specialization to generalization. As a traditional broadband access gateway service, a BNG device is very important in a broadband access service and scenario. Currently, a control plane and user plane separation architecture-based BNG device is widely used.

Figure 1:
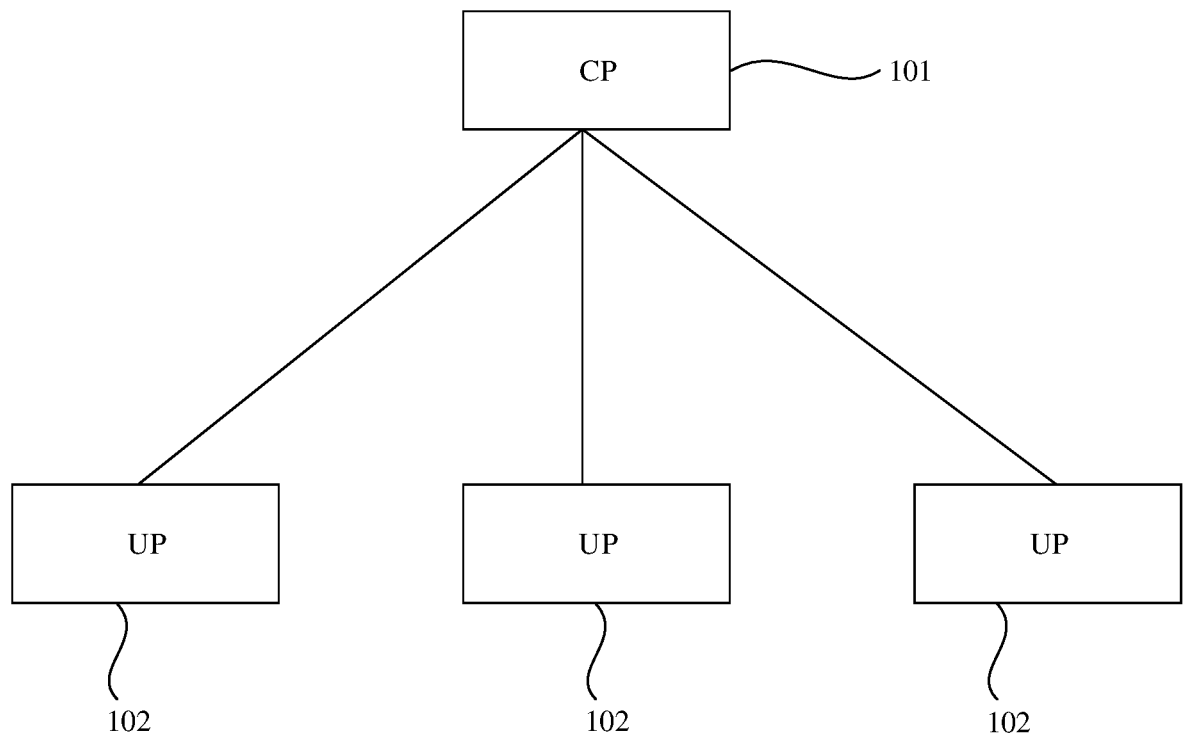
FIG. 1 is a schematic diagram of a structure of a control plane and user plane separation architecture-based BNG device according to the conventional technology.

FIG. 1 shows a control plane and user plane separation architecture-based BNG device. As shown in FIG. 1, the BNG device includes a CP 101 and a UP 102 that are connected in communication. The UP 102 may forward service data from a home gateway to the CP 101, so that the CP 101 performs service access on the corresponding home gateway. As shown in FIG. 1, one CP 101 may be connected to a plurality of UPs 102, so that the CP 101 separately controls the plurality of UPs 102, and one CP 101 can perform service access of a plurality of home gateways. Therefore, performance of the CP 101 in the BNG device can be better utilized, and utilization rate is higher.

Figure 2:
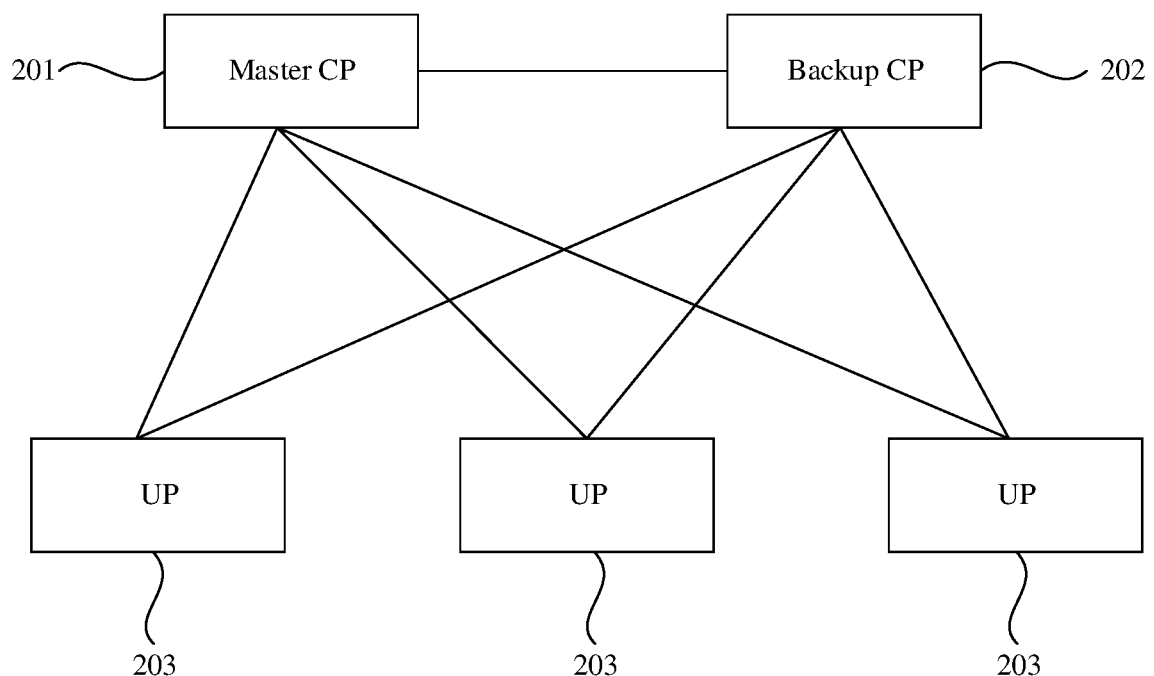
FIG. 2 is a schematic diagram of a structure of another control plane and user plane separation architecture-based BNG device according to the conventional technology.

To avoid a problem that services of the plurality of home gateways cannot be accessed because the CP is faulty, as shown in FIG. 2, two CPs are usually set in the foregoing BNG device. One CP is used as a master CP (for example, a master CP 201 in FIG. 2), and is responsible for service access of the home gateway, and the other CP is used as a backup CP (for example, a backup CP 202 in FIG. 2), and is responsible for performing hot backup for service data from the home gateway. When the master CP 201 is faulty, the backup CP 202 may replace the master CP 201 to perform service access of a newly-accessed home gateway (or referred to as a new home gateway) and service continuation of an already-accessed home gateway (or referred to as an old home gateway). The newly-accessed home gateway is a home gateway that sends a dial-up request to a UP 203 to request service access after the master CP 201 is faulty. The already-accessed home gateway is a home gateway that has performed service access by using the master CP 201. As shown in FIG. 2, the master CP 201 and the backup CP 202 are connected in communication, and master/backup negotiation may be performed between the master CP 201 and the backup CP 202 by sending a heartbeat message. Therefore, when the master CP 201 is faulty, the backup CP 202 may perform service access of the newly-accessed home gateway and service continuation of the already-accessed home gateway.

It can be learned that the backup CP needs to determine, by using the heartbeat message transmitted between the backup CP and the master CP, whether the master CP is faulty, to determine whether to perform service access of the newly-accessed home gateway and service continuation of the already-accessed home gateway. Therefore, when a communication channel between the master CP and the backup CP is faulty, the backup CP cannot receive the heartbeat message sent by the master CP. Therefore, the backup CP makes a misjudgment that the master CP is faulty. In this case, the backup CP starts to perform service access of the newly-accessed home gateway and service continuation of a service operation of the already-accessed home gateway. As a result, in the BNG device, for service data forwarded by a same UP, both the master CP and the backup CP perform corresponding service operations, that is, the master CP and the backup CP perform service access of a same home gateway at the same time, so that a conflict occurs when the BNG device performs service access on the home gateway.

Figure 3:
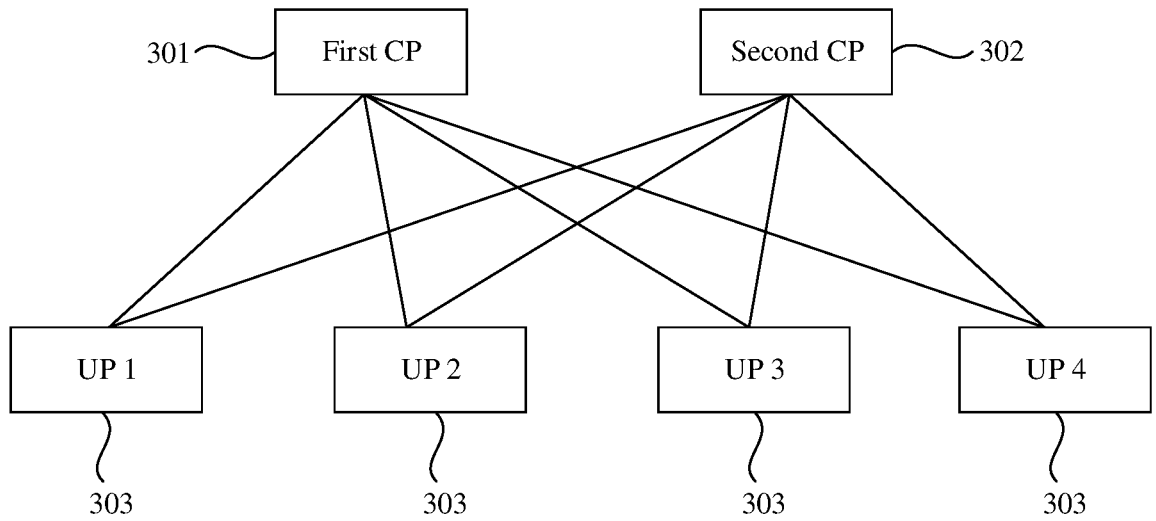
FIG. 3 is a schematic diagram of composition of a network system according to an embodiment of this application.

Therefore, an embodiment of this application provides a master/backup negotiation method. The method may be applied to a network device. The network device may include a first control unit, a second control unit, and a subscriber unit that are connected in communication. For example, the network device is a BNG device, both the first control unit and the second control unit are CPs, for example, respectively referred to as a first CP and a second CP, and the subscriber unit is a UP. FIG. 3 is a schematic diagram of composition of a network system according to an embodiment of this application. As shown in FIG. 3, the network device may include a first CP 301, a second CP 302, and a UP 303. There may be a plurality of UPs 303 (for example, a UP 1, a UP 2, a UP 3, and a UP 4 in FIG. 3). Each UP 303 is connected to the first CP 301 and the second CP 302 in communication. When a home gateway sends service data to a specific UP 303, for example, the UP 1 in FIG. 3, the UP 1 may separately forward the service data from the home gateway to the first CP 301 and the second CP 302. Then, the first CP 301 and the second CP 302 may separately perform corresponding processing on the service data based on respective master/backup states. For example, the first CP 301 may serve as a master CP to perform service access of a corresponding home gateway based on the received service data. The second CP 302 may serve as a backup CP to store and back up the received service data.

It should be noted that, in this embodiment, the first control unit (for example, the first CP), the second control unit (for example, the second CP), and the subscriber unit (for example, the UP) in the network device may all be implemented in a form of software or hardware. This is not limited herein.

With reference to the accompanying drawings, a specific implementation of the master/backup negotiation method provided in this embodiment of this application is described in detail below by using an example in which the network device is the BNG device.

It should be noted that, in the description of this application, words such as "first" and "second" are merely used for distinguishing description, and are not used to specifically limit a feature. In the description of this embodiment of this application, "and/or" describes an association relationship between associated objects, and indicates that three relationships may exist. For example, A and/or B may indicate: Only A exists, both A and B exist, and only B exists. The character "/" generally indicates that the associated objects are in an "OR" relationship. "The at least one" in this application refers to one or more. "A plurality of" refers to two or more.

Figure 4:
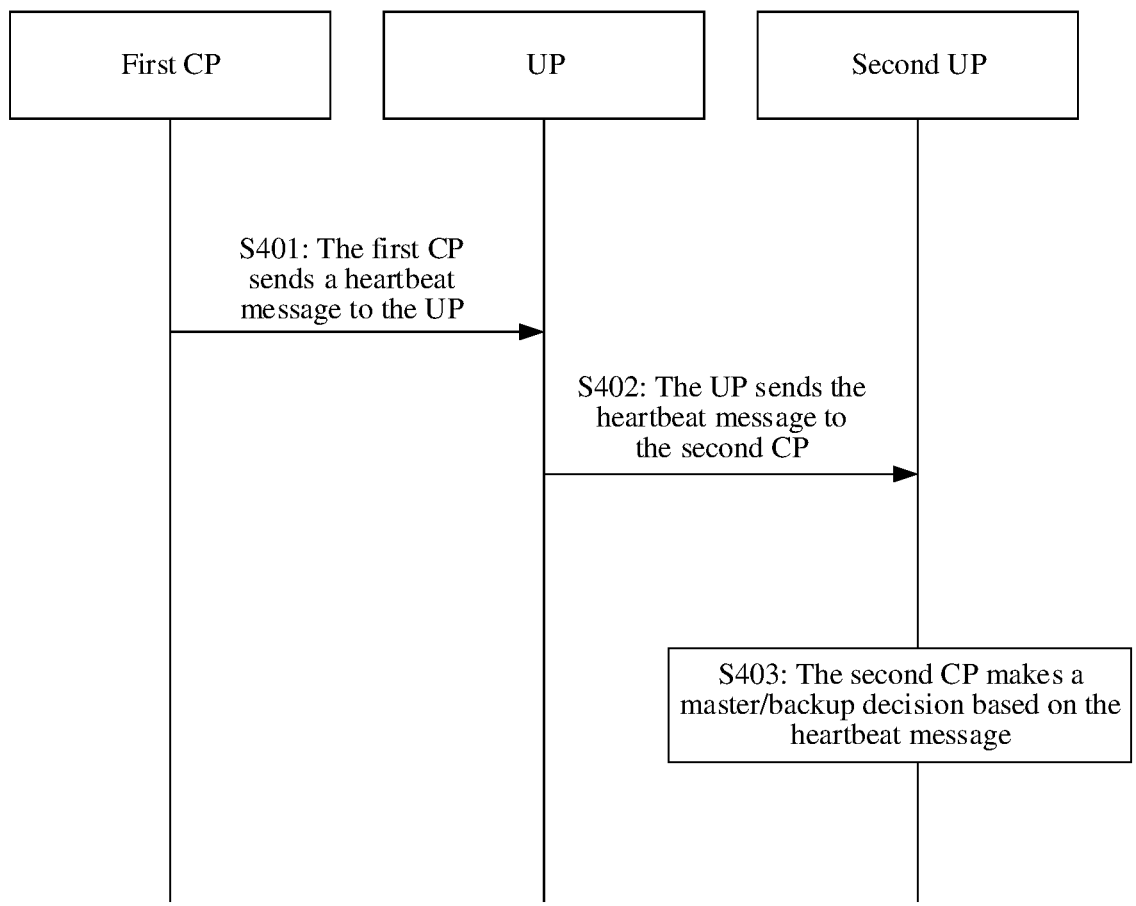
FIG. 4 is a schematic flowchart of a master/backup negotiation method according to an embodiment of this application.

FIG. 4 is a schematic flowchart of a master/backup negotiation method according to an embodiment of this application. The method may be applied to a network device. In this embodiment, for example, the network device is a BNG device, both a first control unit and a second control unit are CPs, for example, respectively referred to as a first CP and a second CP, a subscriber unit is a UP, the first CP is a master CP (or referred to as a master control unit), and the second CP is a backup CP (or referred to as a backup control unit). As shown in FIG. 4, the master/backup negotiation method may include the following S401 to S403.

S401: The first CP sends a heartbeat message to the UP.

Optionally, a plurality of UPs may be set. In this case, the first CP may send a heartbeat message to each UP, or send a heartbeat message to one or more of these CPs, so that the second CP can subsequently receive heartbeat messages forwarded by the plurality of UPs. This prevents a case in which the heartbeat message fails to be received because a specific UP is faulty. For example, four UPs 303 are set in the BNG device shown in FIG. 3. In this case, the first CP 301 may send a heartbeat message to each UP 303, so that the second CP 302 can subsequently receive heartbeat messages forwarded by the plurality of UPs 303. Alternatively, the first CP 301 may separately send heartbeat messages to specific two or three of the four UPs 303, so that the second CP 302 can subsequently receive heartbeat messages forwarded by the plurality of UPs 303.

In some embodiments, the heartbeat message may be a control plane and user plane separation protocol (control plane and user plane separated protocol, CUSP) message. A CUSP protocol used by the CUSP message is a communication protocol established between a CP (for example, the first CP and the second CP) and a UP in the BNG device for processing a corresponding service of the home gateway. The CUSP message (or the heartbeat message) is usually repeatedly sent according to a specific period, so that a receiver (for example, the second CP) that receives the heartbeat message can determine an activity status of the first CP based on whether the heartbeat message is received within the preset period. In this way, the second CP may make a master/backup decision by using the heartbeat message.

For example, the CUSP message may include two fields, for example, a first field and a second field. The first field may indicate that a message type of the CUSP message is the heartbeat message. The second field may indicate master/backup states of the first CP and the second CP. For example, the first field may be an identifier of the message type (for example, a number of the message type). The type identifier corresponds to the message type being the heartbeat message, that is, the type identifier may indicate that the message type is the heartbeat message. The second field may be a priority of the first CP (the priority refers to a priority of performing service access of the home gateway by the CP), so that after receiving the heartbeat message, the second CP can make the master/backup decision based on a priority of the second CP and the priority of the first CP.

The first CP may be a master CP, and send, by using the UP, the heartbeat message to the second CP used as a backup CP. Alternatively, the first CP may be a backup CP, and send the heartbeat message to the second CP used as a master CP. Alternatively, the first CP and the second CP may send heartbeat messages to each other. This is not limited herein.

In some possible embodiments, all message types defined in the original CUSP protocol are used for service interaction between the CP and the UP. That is, after receiving a CUSP message of a specific type, the CP performs corresponding service processing. Alternatively, after receiving a CUSP message of a specific type, the UP performs corresponding service processing. For example, Table 1 shows existing message types in the CUSP protocol.

TABLE 1

| Number | Name |
| --- | --- |
| 0 | Reserved |
| 1 | Hello |
| 2 | Keepalive |
| 3 | Sync_Request |
| 4 | Sync_Begin |
| 5 | Sync_Data |
| 6 | Sync_End |
| 7 | Update_Request |
| 8 | Update_Response |
| 9 | Report |
| 10 | Event |
| 11 | Vendor |
| 12 | Error |
| 13 to 199 | Unassigned |
| 200 | Addr_Allocation_Req |
| 201 | Addr_Allocation_Ack |
| 202 | Addr_Renew_Req |
| 203 | Addr_Renew_Ack |
| 204 | Addr |
| 205 | Addr_Release_Ack |
| 206 to 254 | Unassigned |
| 255 | Reserved |

Reserved indicates that the message type is a reserved identifier, Keepalive indicates a liveness detection mechanism, Sync_Request indicates a synchronization request, Sync_Begin indicates synchronization start, Sync_Data indicates synchronization data, Sync_End indicates synchronization end, Update_Request indicates an update request, Update_Response indicates an update response, Report indicates a report message, Event indicates an event message, Vendor indicates a third-party message, Error indicates an error message, Unassigned indicates an unassigned message type (for example, a corresponding message type is not assigned for a corresponding number), Addr_Allocation_Req indicates an address allocation request, Addr_Allocation_Ack indicates an address allocation acknowledgment, Addr_Renew_Req indicates an address extension request, Addr_Renew_Ack indicates an address extension acknowledgment, Addr indicates an address message, and Addr_Release_Ack indicates an address release acknowledgment.

In this embodiment, a message type of the heartbeat message may be newly-added to the CUSP protocol. A number of the message type (or an identifier of the message type) may be a message type number reserved in an existing message type in the CUSP protocol (or a number for which a corresponding message type is not assigned). For example, as shown in Table 2, a number of the newly-added message type is 15, and a name of the message type is "CP heartbeat".

TABLE 2

| Number | Name |
| --- | --- |
| 15 | CP heartbeat |

In some other embodiments, the UPs may be divided to form a user group. For example, each UP may be used as a user group, specific several (for example, two) UPs may be used as a user group, or each interface of the UP may be used as a user group. The master/backup states of the first CP and the second CP may be set for different user groups. That is, for different user groups, different master/backup states may be set for the first CP and the second CP.

For example, when each UP is used as the user group, or the specific several UPs are used as the user group, the first CP and the second CP may set different master/backup states for each user group. For example, the BNG device includes four UPs: a UP 1, a UP 2, a UP 3, and a UP 4. The four UPs are separately connected to the first CP and the second CP. The UP 1 and the UP 2 may be grouped into a first user group (or a first disaster recovery group or a first UP group), and the UP 2 and the UP 3 may be grouped into a second user group (or a second disaster recovery group or a second UP group). For the first user group, the first CP may be set as a master CP, and the second CP may be set as a backup CP, that is, a priority of performing home gateway service access by the first CP is higher than a priority of performing home gateway service access by the second CP. For the second UP group, the second CP may be set as a master CP, and the first CP may be set as a backup CP, that is, a priority of performing home gateway service access by the second CP is higher than a priority of performing home gateway service access by the first CP. For another example, the BNG device includes two UPs: a UP 1 and a UP 2. The UP 1 is used as a first user group, and the UP 2 is used as a second user group. For the first user group, the first CP may be set as a master CP, and the second CP may be set as a backup CP, that is, a priority of performing home gateway service access by the first CP is higher than a priority of performing home gateway service access by the second CP. For the second user group, the second CP may be set as a master CP, and the first CP may be set as a backup CP, that is, a priority of performing home gateway service access by the second CP is higher than a priority of performing home gateway service access by the first CP.

For example, when each interface of the UP is used as the user group, the first CP and the second CP may further set different master/backup states for each user group (in other words, the first CP and the second CP set different master/backup states for different interfaces of the UP). For example, the BNG device includes a plurality of UPs. A specific UP (for example, the first UP) has an interface 1 and an interface 2, where the interface 1 is used as a first user group, and the interface 2 is used as a second user group. For the first user group, the first CP may be set as a master CP, and the second CP may be set as a backup CP, that is, a priority of performing home gateway service access by the first CP is higher than a priority of performing home gateway service access by the second CP. For the second user group, the second CP may be set as a master CP, and the first CP may be set as a backup CP, that is, a priority of performing home gateway service access by the second CP is higher than a priority of performing home gateway service access by the first CP.

The master/backup states of the first CP and the second CP are set in this manner, so that when both the first CP and the second CP run normally, both the first CP and the second CP can be fully utilized, thereby improving utilization of the first CP and the second CP.

Therefore, the CUSP message may further include another field, for example, a third field. This field indicates user groups corresponding to the master/backup states of the first CP and the second CP. In this way, the second CP can determine, based on the third field, a user group specifically corresponding to the master/backup state indicated by the second field. Then, the second CP may confirm a master/backup state (or master/backup state negotiation) of the determined user group based on the second field.

For example, the third field may be identifiers of user groups corresponding to the master/backup states of the first CP and the second CP. For example, when the master/backup states of the first CP and the second CP are set based on different UP groups (that is, a user group formed by the plurality of UPs), the third field may be an identifier of a UP group corresponding to the master/backup state indicated by the second field. When the master/backup states of the first CP and the second CP are separately set based on different UPs (that is, each UP is used as a user group), the third field may be an identifier of a UP corresponding to the master/backup state indicated by the second field. When the master/backup states of the first CP and the second CP are set based on different interfaces of the UP (that is, each interface of the UP is used as a user group), the third field may be an identifier of an interface of the UP corresponding to the master/backup state indicated by the second field.

For example, the message type of the heartbeat message is the newly-added message type, the first CP is the master CP, the second CP is the backup CP, and the second field is the priority of the first CP when the first CP is the master CP.

A message format of the CUSP message may be:

---

<CP_Heartbeat>=<Common Header>
    <Disaster Negotiation TLV>
        <Disaster Key subTLV>
        <Disaster priority subTLVs>

---

Figure 5:
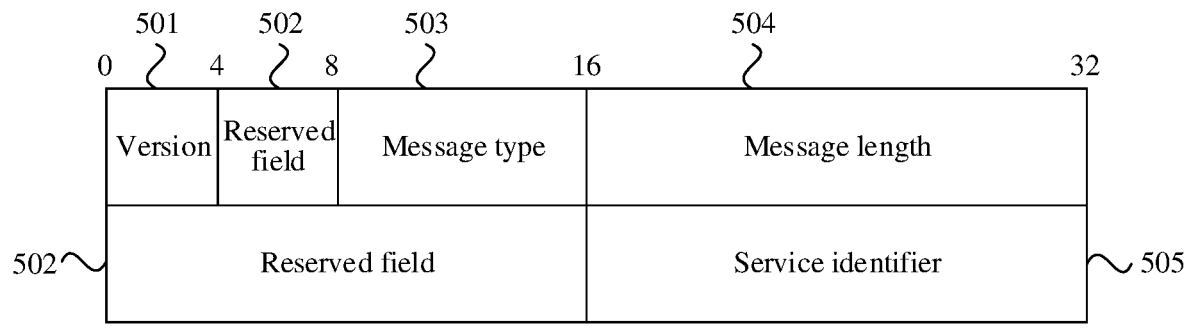
FIG. 5 is a schematic diagram of a structure of a packet of a CUSP message according to an embodiment of this application.

<Common Header> is a packet header of the CUSP message. As shown in FIG. 5, the packet header of the CUSP message may include a version 501, a reserved field 502, a message type 503, a message length 504, a service identifier 505, and the like. The message type may be the heartbeat message, and may be represented by a number corresponding to the message type, for example, "15" (that is, the first field in the foregoing CUSP message).

<Disaster Negotiation TLV> is a packet body of the CUSP message, that is, specific message content. It may include the identifiers of the user groups corresponding to the master/backup states of the first CP and the second CP, for example, the identifier of the interface of the UP, the identifier of the UP, or the identifier of the UP group (that is, the foregoing third field), that is, <Disaster Key subTLV>. It may further include the priority of the first CP (that is, the foregoing second field), that is, <Disaster priority subTLVs>.

Figure 6:
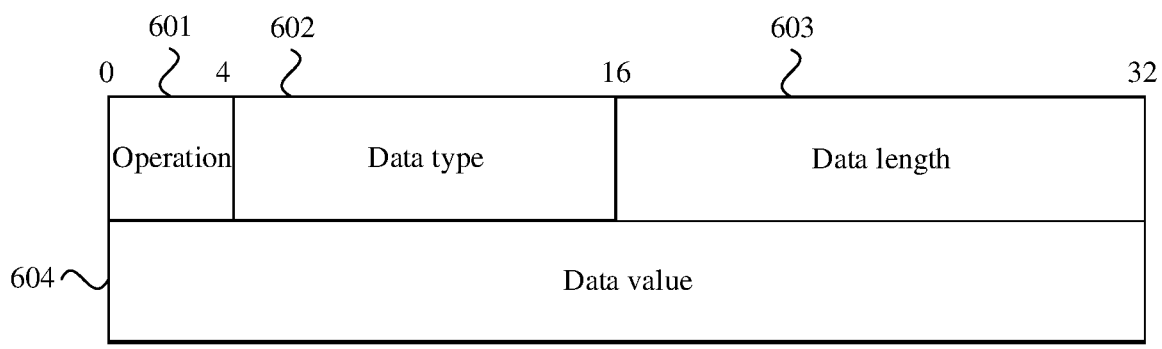
FIG. 6 is a schematic diagram of a structure of a packet of another CUSP message according to an embodiment of this application.

<Disaster Negotiation TLV> may be in a TLV (type length value) format shown in FIG. 6. As shown in FIG. 6, <Disaster Negotiation TLV> in the TLV format may include an operation (oper) 601, and the oper may indicate a message type for performing an operation on a data set. For example, a value of oper may be 0, or the like. A data type (Type) 602 (for example, a value of the field is 103), a data length 603 (Length) (for example, a value of this field is a total length of <Disaster Key subTLV> and <Disaster priority subTLVs>), and a data value 604 (Value) are included.

Figure 7:
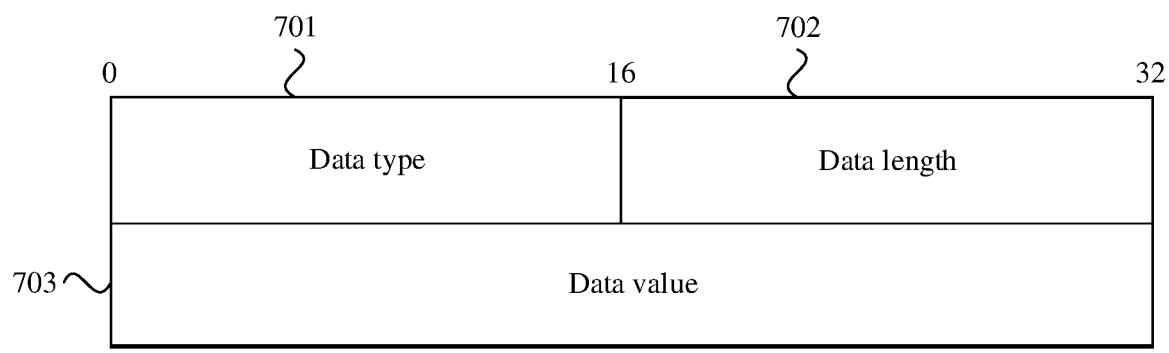
FIG. 7 is a schematic diagram of a structure of a packet of still another CUSP message according to an embodiment of this application.

<Disaster Key subTLV> and <Disaster priority subTLVs> may separately use a sub-TLV format as a value field of <Disaster Negotiation TLV>. FIG. 7 shows a sub-TLV format. As shown in FIG. 7, the sub-TLV format may include a data type (Type) 701, a data length (Length) 702, and a data value (Value) 703.

For example, in <Disaster Key subTLV>, a value of Type may be 11, and a value of Length may be 128. When the master/backup states of the first CP and the second CP are set based on different UP groups, Value may be identifiers of UP groups corresponding to the master/backup states of the first CP and the second CP. When the master/backup states of the first CP and the second CP are separately set based on different UPs, Value may be identifiers of UPs corresponding to the master/backup states of the first CP and the second CP. When the master/backup states of the first CP and the second CP are set based on different interfaces of the UP, Value may be identifiers of interfaces of the UP corresponding to the master/backup states of the first CP and the second CP.

Figure 8:
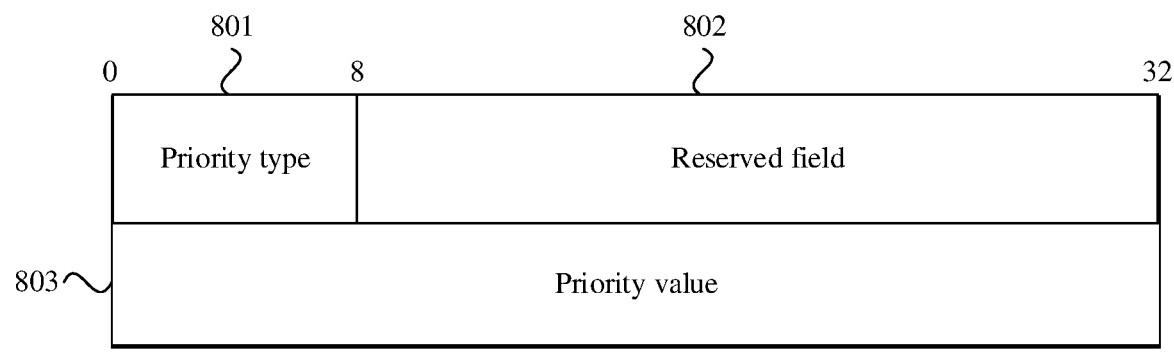
FIG. 8 is a schematic diagram of a structure of a packet of yet another CUSP message according to an embodiment of this application.

For example, in <Disaster priority subTLVs>, a value of Type may be 12, and a value of Length may be 8. Value may be shown in FIG. 8, and may include a priority type 801 (priority type), a reserved field 802 (Reserved), and a priority value 803 (Priority). A length of the priority type may be 1 byte, a length of the reserved field may be 3 bytes, and a length of the priority value may be 4 bytes. The priority type may indicate whether the priority value is a current priority or a configured priority. For example, when the priority type is 0, it indicates that the priority value is the current priority, and when the priority type is 1, it indicates that the priority value is the configured priority, or the like. The priority value may be the priority of the first CP when the first CP is the master CP, that is, a priority correspondingly set for the first CP relative to the user group indicated by Value in the foregoing <Disaster Key subTLV>.

S402: The UP sends the received heartbeat message to the second CP.

A process in which the UP receives the heartbeat message from the first CP and sends the heartbeat message to the second CP may be a forwarding process. That is, when the UP receives a CUSP message from the first CP, after the UP determines that the CUSP message is the heartbeat message, the UP may forward the CUSP message received by the UP from the first CP to the second CP.

It should be noted that when a plurality of UPs separately connected to the first CP and the second CP are set in the BNG device, the heartbeat message of the first CP may be forwarded by using all the UPs, or the heartbeat message may be forwarded by using one or more of the UPs. This is not limited herein. When the plurality of UPs forward the heartbeat message, if one of the UPs is faulty and the heartbeat message cannot be forwarded, the second CP may still receive a heartbeat message forwarded by another UP, thereby improving reliability of heartbeat message transmission.

S403: The second CP makes the master/backup decision based on the heartbeat message.

In some embodiments, the second CP may determine the master/backup states of the first CP and the second CP based on a related field in the received heartbeat message. For example, when the second CP receives the heartbeat message and determines that the first CP is the master CP, the second CP is used as the backup CP to back up service data, of the home gateway, forwarded by the UP. Alternatively, when the priority of the first CP changes, and the second CP receives the heartbeat message and determines that the second CP is the master CP, the second CP switches to the master CP to perform service access of the home gateway. In this case, the second CP starts to send the heartbeat message to the first CP, so that the first CP determines, based on the received heartbeat message, that the first CP is the backup CP, and the first CP switches to the backup CP to back up service data, of the home gateway, forwarded by the UP.

For example, when the first CP and the second CP are set to same master/backup states for all the UPs, the first CP and the second CP are mutually set with only one group of corresponding priorities, to define the master/backup states of the first CP and the second CP. For example, for all the UPs, the first CP is set as the master CP, and the second CP is set as the backup CP. In other words, a set priority of the first CP is higher than a set priority of the second CP. After the second CP receives the heartbeat message, the second CP may determine the master/backup states of the first CP and the second CP based on the second field in the heartbeat message. For example, the second field is the priority of the first CP, and the second CP may compare the priority with the priority of the second CP, to determine the master/backup states of the first CP and the second CP. That is, when the priority of the first CP is higher than the priority of the second CP, the second CP determines that the first CP is the master CP and the second CP is the backup CP. If the priority of the first CP changes, and a changed priority of the first CP is lower than the priority of the second CP, the second CP may determine that the second CP is the master CP. In this case, the second CP switches to the master CP to perform service access of the home gateway. In addition, the second CP sends the heartbeat message to the first CP, so that the first CP determines, based on the received heartbeat message, that the first CP is the backup CP, and the first CP switches to the backup CP to back up service data, of the home gateway, forwarded by the UP.

When the master/backup states of the first CP and the second CP are set based on different UP groups (that is, the plurality of UPs form a user group), priorities corresponding to a plurality of groups may be separately set in the first CP and the second CP for the different UP groups, so that the master/backup states of the first CP and the second CP are defined for the different UP groups. For example, four UPs (for example, the UPs 303 in FIG. 3), a UP 1, a UP 2, a UP 3, and a UP 4, are set in the BNG device. The UP 1 and the UP 2 are grouped into a first UP group, and the UP 3 and the UP 4 are grouped into a second UP group. For the first UP group, the first CP may be set as a master CP, and the second CP may be set as a backup CP. That is, a priority group for the first UP group is correspondingly set for the first CP and the second CP, for example, a first priority group, where a priority of the first CP is higher than a priority of the second CP. For the second UP group, the first CP may be set as a backup CP, and the second CP may be set as a master CP. That is, a priority group for the second UP group, for example, a second priority group, is correspondingly set for the first CP and the second CP, where a priority of the first CP is lower than a priority of the second CP. After the second CP receives the heartbeat message, the second CP may determine the master/backup states of the first CP and the second CP based on the second field and the third field in the heartbeat message. For example, the second field is a priority corresponding to the first CP when the first CP is the master CP, that is, the priority of the first CP that is set in the first priority group. The third field is an identifier of a corresponding UP group when the first CP is the master CP (or the master/backup state of the first CP when the first CP is the master CP), that is, an identifier of the first UP group. In this case, the second CP may determine, based on the third field, to use the priority, of the second CP in the first priority group, set for the first UP group, and compare the priority with the priority of the first CP in the heartbeat message, to determine the master/backup states of the first CP and the second CP. That is, when the priority of the first CP is higher than the priority of the second CP, the second CP determines that the first CP is the master CP and the second CP is the backup CP. If the priority of the first CP changes, and a changed priority of the first CP is lower than the priority of the second CP, the second CP may determine that the second CP is the master CP. In this case, the second CP switches to the master CP to perform service access of the home gateway. In addition, the second CP sends the heartbeat message to the first CP, so that the first CP determines, based on the received heartbeat message, that the first CP is the backup CP, and the first CP switches to the backup CP to back up service data, of the home gateway, forwarded by the UP.

When the master/backup states of the first CP and the second CP are separately set based on different UPs (that is, each UP is used as a user group), priorities corresponding to a plurality of groups may be separately set in the first CP and the second CP for the different UPs, so that the master/backup states of the first CP and the second CP are defined for the different UPs. For example, two UPs, a UP 1 and a UP 2, are set in the BNG device. For the UP 1, the first CP may be set as a master CP, and the second CP may be set as a backup CP. That is, a priority group for the UP 1 is correspondingly set for the first CP and the second CP, for example, a first priority group, where a priority of the first CP is higher than a priority of the second CP. For the UP 2, the first CP may be set as a backup CP, and the second CP may be set as a master CP. That is, a priority group for the UP 2 is correspondingly set for the first CP and the second CP, for example, a second priority group, where a priority of the first CP is lower than a priority of the second CP. After the second CP receives the heartbeat message, the second CP may determine the master/backup states of the first CP and the second CP based on the second field and the third field in the heartbeat message. For example, the second field is a priority corresponding to the first CP when the first CP is the master CP, that is, the priority of the first CP that is set in the first priority group. The third field is an identifier of a corresponding UP when the first CP is the master CP (or the master/backup state of the first CP when the first CP is the master CP), that is, an identifier of the UP 1. In this case, the second CP may determine, based on the third field, to use the priority, of the second CP in the first priority group, set for the UP 1, and compare the priority with the priority of the first CP in the heartbeat message, to determine the master/backup states of the first CP and the second CP. That is, when the priority of the first CP is higher than the priority of the second CP, the second CP determines that the first CP is the master CP and the second CP is the backup CP. If the priority of the first CP changes, and a changed priority of the first CP is lower than the priority of the second CP, the second CP may determine that the second CP is the master CP. In this case, the second CP switches to the master CP to perform service access of the home gateway. In addition, the second CP sends the heartbeat message to the first CP, so that the first CP determines, based on the received heartbeat message, that the first CP is the backup CP, and the first CP switches to the backup CP to back up service data, of the home gateway, forwarded by the UP.

When the master/backup states of the first CP and the second CP are separately set based on different interfaces of the UP (that is, each interface of the UP is used as a user group), priorities corresponding to a plurality of groups may be separately set in the first CP and the second CP for the different interfaces of the UP, so that the master/backup states of the first CP and the second CP are defined for the different interfaces of the UP. For example, the BNG device includes a plurality of UPs, and a specific UP (for example, the first UP) has an interface 1 and an interface 2. For the interface 1, the first CP may be set as a master CP, and the second CP may be set as a backup CP. That is, a priority group for the interface 1 is correspondingly set for the first CP and the second CP, for example, a first priority group, where a priority of the first CP is higher than a priority of the second CP. For the interface 2, the first CP may be set as a backup CP, and the second CP may be set as a master CP. That is, a priority group for the interface 2 is correspondingly set for the first CP and the second CP, for example, a second priority group, where a priority of the first CP is lower than a priority of the second CP. After the second CP receives the heartbeat message, the second CP may determine the master/backup states of the first CP and the second CP based on the second field and the third field in the heartbeat message. For example, the second field is a priority corresponding to the first CP when the first CP is the master CP, that is, the priority of the first CP that is set in the first priority group. The third field is an identifier of an interface of a corresponding UP when the first CP is the master CP (or the master/backup state of the first CP when the first CP is the master CP), that is, an identifier of the interface 1 of the first UP. In this case, the second CP may determine, based on the third field, to use the priority, of the second CP in the first priority group, set for the interface 1, and compare the priority with the priority of the first CP in the heartbeat message, to determine the master/backup states of the first CP and the second CP. That is, when the priority of the first CP is higher than the priority of the second CP, the second CP determines that the first CP is the master CP and the second CP is the backup CP. If the priority of the first CP changes, and a changed priority of the first CP is lower than the priority of the second CP, the second CP may determine that the second CP is the master CP. In this case, the second CP switches to the master CP to perform service access of the home gateway. In addition, the second CP sends the heartbeat message to the first CP, so that the first CP determines, based on the received heartbeat message, that the first CP is the backup CP, and the first CP switches to the backup CP to back up service data, of the home gateway, forwarded by the UP.

In some possible embodiments, when the second CP receives no heartbeat message from the UP, it indicates that the first CP sends no heartbeat message. Therefore, the second CP may determine that the first CP is faulty, the second CP starts to perform service access of a newly-accessed home gateway, and performs service continuation of a home gateway already accessed by the first CP, that is, when the second CP determines that the first CP is faulty, the second CP switches to the master CP. To avoid misjudgment, the second CP may switch to the master CP when the second CP receives no heartbeat message within preset duration. For example, when the second CP receives no heartbeat message within three consecutive periods, namely, the preset period, the second CP starts to perform service access of the newly-accessed home gateway, and performs service continuation of the home gateway already accessed by the first CP.

By using the method in the foregoing embodiment, when the master/backup state negotiation is performed between the first CP and the second CP in the BNG device and the backup CP (for example, the second CP) determines that the master CP (for example, the first CP) is faulty, both the master/backup negotiation operations, performed by the backup CP, of service access of the newly-accessed home gateway and service continuation of the already-connected home gateway may be implemented by using the heartbeat message forwarded by the UP between the first CP and the second CP. For example, the first CP is used as the master CP to send the heartbeat message, and forwards, by the UP, the heartbeat message to the second CP that is used as the backup CP. Generally, the plurality of UPs are set in the BNG device. Each UP forwards the heartbeat message from the first CP to the second CP. If one of the UPs is faulty and the heartbeat message cannot be forwarded, the second CP may still receive a heartbeat message forwarded by another UP. In this way, the following dual-master problem that when the first CP and the second CP are directly connected in communication to send the heartbeat message, because a communication channel is faulty, the backup CP (for example, the second CP) misjudges that the master CP (for example, the first CP) is faulty because the backup CP fails to receive the heartbeat message, and starts to perform service access of the newly-accessed home gateway and perform service continuation of the already-accessed home gateway can be avoided.

The foregoing mainly describes the solutions provided in embodiments of this application from a perspective of interaction between the units. It may be understood that, to implement the foregoing functions, the units, for example, the subscriber unit, the first control unit, and the second control unit, include corresponding hardware structures and/or software modules for performing the functions. A person skilled in the art should easily be aware that, in combination with algorithm steps of the examples described in embodiments disclosed in this specification, the methods in embodiments of this application can be implemented by hardware, software, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the subscriber unit, the first control unit, and the second control unit may be divided into function modules based on the foregoing method examples. For example, each function module may be obtained through division corresponding to each function, or two or more functions may be integrated into one module. The integrated module may be implemented in a form of hardware, or may be implemented in a form of a software function module. It should be noted that the module division in embodiments of this application is an example, and is merely logical function division. There may be another division manner in an actual implementation.

Figure 9:
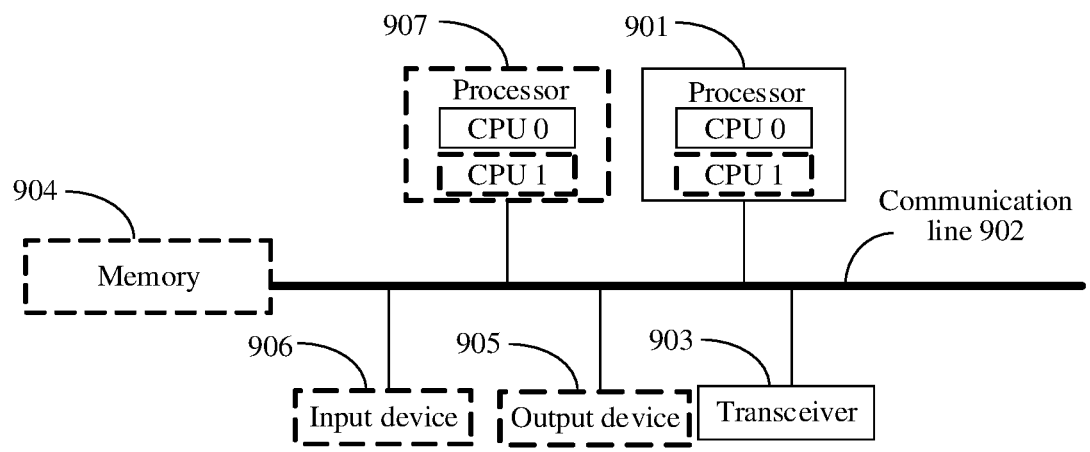
FIG. 9 is a schematic diagram of a structure of a network device according to an embodiment of this application.

During specific implementation, the units shown in this application are as follows. The subscriber unit, the first control unit, and the second control unit may use a composition structure shown in FIG. 9 or include components shown in FIG. 9. FIG. 9 is a schematic diagram of a structure of a network device according to an embodiment of this application. When having a function of the subscriber unit in embodiments of this application, for example, embodiments shown in FIG. 1 to FIG. 4, the network device may be a subscriber unit, or a chip or a system on chip in the subscriber unit. When the network device has a function of the control unit (for example, the first control unit or the second control unit) in embodiments of this application, for example, embodiments shown in FIG. 1 to FIG. 4, the network device may be a control unit, or a chip or a system on chip in the control unit.

As shown in FIG. 9, the network device may include a processor 901, a communication line 902, and a transceiver 903. The processor 901, a memory 904, and the transceiver 903 may be connected through the communication line 902. In an example, the processor 901 may include one or more CPUs, for example, a CPU 0 and a CPU 1 in FIG. 9.

In an optional implementation, the network device includes a plurality of processors. For example, in addition to the processor 901 in FIG. 9, the network device may further include a processor 907.

The processor 901 may be a central processing unit (CPU), a general-purpose processor, a network processor (NP), a digital signal processor (DSP), a microprocessor, a microcontroller, a programmable logic device (PLD), or any combination thereof. Alternatively, the processor 901 may be another apparatus having a processing function, for example, a circuit, a component, or a software module.

The communication line 902 is used to transmit information between components included in an electronic device.

The transceiver 903 is configured to communicate with another device. The transceiver 903 may be an interface circuit, a pin, a radio frequency module, a transceiver, or any apparatus that can implement communication.

Further, the electronic device may further include the memory 904. The memory 904 is configured to store instructions. The instructions may be a computer program.

The memory 904 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), or a compact disc read-only memory (CD_ROM) or another optical disk storage, optical disc storage, magnetic disk storage medium or another magnetic storage device. The optical disc storage includes compressed optical disc, laser disc, optical disc, digital versatile disc, Blu-ray disc, or the like.

It should be noted that the memory 904 may exist independently of the processor 901, or may be integrated with the processor 901. The memory 904 may be configured to store instructions, program code, some data, or the like. The memory 904 may be located in the network device, or may be located outside the network device. This is not limited. When executing the instructions stored in the memory 904, the processor 901 can implement the master/backup negotiation method provided in the foregoing embodiments of this application.

In an optional implementation, the network device further includes an output device 905 and an input device 906. For example, the input device 906 is a device such as a keyboard, a mouse, a microphone, or a joystick, and the output device 905 is a device such as a display or a speaker.

It should be noted that the composition structure shown in FIG. 9 does not constitute a limitation on the network device. In addition to the components shown in FIG. 9, the network device may include more or fewer components than those shown in the figure, or combine some components, or have different component arrangements.

When the network device has a function of the subscriber unit in embodiments of this application, for example, embodiments shown in FIG. 1 to FIG. 4, the processor executes the instructions in the memory to instruct the network device to perform the following processing: receiving a heartbeat message from the first control unit, and then sending the heartbeat message to the second control unit, so that the second control unit makes a master/backup decision based on the heartbeat message. For a specific implementation, refer to the detailed description of step 401 and the detailed description of step 402 in the embodiment shown in FIG. 4. Details are not described herein again.

When the network device has a function of the first control unit in embodiments of this application, for example, embodiments shown in FIG. 1 to FIG. 4, the processor executes the instructions in the memory to instruct the network device to perform the following processing: generating a heartbeat message by using a communication protocol between the network device and the subscriber unit, and then sending the heartbeat message to the subscriber unit. Therefore, the subscriber unit sends the heartbeat message to the second control unit, so that the second control unit can make a master/backup decision based on the heartbeat message. For a specific implementation, refer to the detailed description of step 401 in the embodiment shown in FIG. 4. Details are not described herein again.

When the network device has a function of the second control unit in embodiments of this application, for example, embodiments shown in FIG. 1 to FIG. 4, the processor executes the instructions in the memory to instruct the network device to perform the following processing: when the subscriber unit sends a heartbeat message, receiving the heartbeat message that is of the first control unit and that is forwarded by the subscriber unit, and then making a master/backup decision based on the heartbeat message. For a specific implementation, refer to the detailed description of step 403 in the embodiment shown in FIG. 4. Details are not described herein again.

In this embodiment of this application, the chip system may include a chip, or may include a chip and another discrete component.

Figure 10:
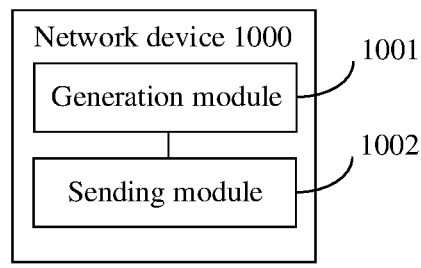
FIG. 10 is a schematic diagram of a structure of another network device according to an embodiment of this application.

FIG. 10 is a schematic diagram of a structure of another network device woo. The network device 1000 is used in a network system. The network system includes a first control unit, a second control unit, and a subscriber unit. The network device 1000 is the first control unit. The network device 1000 may be a device in an entire system form, a chip in the device, a system on chip in the device, another device that can implement a function of the first control unit in embodiments of this application, for example, embodiments shown in FIG. 1 to FIG. 4, or the like. The network device 1000 may be configured to perform the function of the first control unit in the foregoing method embodiment. In a possible implementation, the network device 1000 shown in FIG. 10 includes a generation module 1001, a sending module 1002, and the like.

The generation module 1001 may be configured to generate a heartbeat message by using a communication protocol between the first control unit and the subscriber unit. The sending module 1002 may be configured to send the heartbeat message to the subscriber unit, where the heartbeat message is used by the second control unit to make a master/backup decision. For a specific implementation, refer to the detailed description of step 401 in the embodiment shown in FIG. 4. Details are not described herein again.

In a specific implementation, the heartbeat message is a CUSP message.

In a possible design, the CUSP message includes a first field and a second field, where the first field indicates that a message type of the CUSP message is the heartbeat message, and the second field indicates master/backup states of the first control unit and the second control unit.

In a possible design, the second field is a priority of the first control unit.

In a possible design, the CUSP message further includes a third field, and the third field indicates a subscriber unit controlled by the first control unit when the first control unit is a master control unit.

In a possible design, the third field is an identifier, of the subscriber unit, corresponding to the master/backup state.

The first control unit may be configured to execute a function of the first control unit in the foregoing master/backup negotiation method, and therefore can achieve the same effect as the foregoing master/backup negotiation method. Details are not described herein again.

Figure 11:
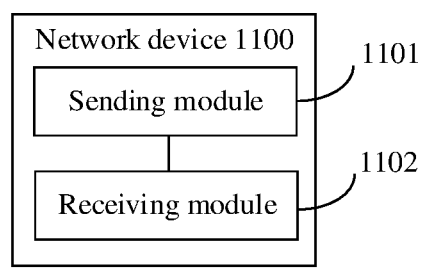
FIG. 11 is a schematic diagram of a structure of still another network device according to an embodiment of this application.

FIG. 11 is a schematic diagram of a structure of another network device 1100. The network device 1100 is used in a network system. The network system includes a first control unit, a second control unit, and a subscriber unit. The network device 1100 is the subscriber unit. The network device 1100 may be a device in an entire system form, a chip in the device, a system on chip in the device, another device that can implement a function of the subscriber unit in embodiments of this application, for example, embodiments shown in FIG. 1 to FIG. 4, or the like. The network device 1100 may be configured to perform the function of the subscriber unit in the foregoing method embodiment. In a possible implementation, the network device 1100 shown in FIG. 11 includes: a sending module 1101, a receiving module 1102, and the like.

The receiving module 1102 may be configured to receive a heartbeat message from the first control unit. The sending module 1101 may be configured to send the heartbeat message to the second control unit, where the heartbeat message is used by the second control unit to make a master/backup decision. For a specific implementation, refer to the detailed description of step 402 in the embodiment shown in FIG. 4. Details are not described herein again.

In a specific implementation, the heartbeat message is a CUSP message.

In a possible design, the CUSP message includes a first field and a second field, where the first field indicates that a message type of the CUSP message is the heartbeat message, and the second field indicates master/backup states of the first control unit and the second control unit.

In a possible design, the second field is a priority of the first control unit.

In a possible design, the CUSP message further includes a third field, and the third field indicates a subscriber unit controlled by the first control unit when the first control unit is a master control unit.

In a possible design, the third field is an identifier, of the subscriber unit, corresponding to the master/backup state.

The network device may be configured to execute a function of the subscriber unit in the foregoing master/backup negotiation method, and therefore can achieve the same effect as the foregoing master/backup negotiation method. Details are not described herein again.

Figure 12:
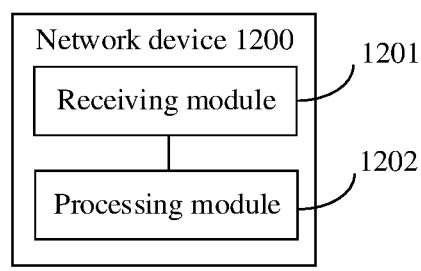
FIG. 12 is a schematic diagram of a structure of yet another network device according to an embodiment of this application.

FIG. 12 is a schematic diagram of a structure of another network device 1200. The network device 1200 is used in a network system. The network system includes a first control unit, a second control unit, and a subscriber unit. The network device 1200 is the second control unit. The network device 1200 may be a device in an entire system form, a chip in the device, a system on chip in the device, another device that can implement a function of the second control unit in embodiments of this application, for example, embodiments shown in FIG. 1 to FIG. 4, or the like. The network device 1200 may be configured to perform the function of the second control unit in the foregoing method embodiment. In a possible implementation, the network device 1200 shown in FIG. 12 includes: a receiving module 1201, a processing module 1202, and the like.

The receiving module 1201 may be configured to receive a heartbeat message from the subscriber unit. The processing module 1202 may be configured to make a master/backup decision based on the heartbeat message. For a specific implementation, refer to the detailed description of step 403 in the embodiment shown in FIG. 4. Details are not described herein again.

In a specific implementation, the heartbeat message is a CUSP message.

In a possible design, the CUSP message includes a first field and a second field, where the first field indicates that a message type of the CUSP message is the heartbeat message, and the second field indicates master/backup states of the first control unit and the second control unit.

In a possible design, the second field is a priority of the first control unit.

In a possible design, the CUSP message further includes a third field, and the third field indicates a subscriber unit controlled by the first control unit when the first control unit is a master control unit.

In a possible design, the third field is an identifier, of the subscriber unit, corresponding to the master/backup state.

The network device may be configured to execute a function of the second control unit in the foregoing master/backup negotiation method, and therefore can achieve the same effect as the foregoing master/backup negotiation method. Details are not described herein again.

An embodiment of this application provides a network system. The network system may include a first control unit, a second control unit, and at least one subscriber unit. The first control unit and the second control unit are separately connected to the subscriber unit.

The first control unit may be configured to send a heartbeat message to the subscriber unit, where the heartbeat message indicates the second control unit to make a master/backup decision. The subscriber unit may be configured to send the received heartbeat message to the second control unit. The second control unit may be configured to make the master/backup decision based on the received heartbeat message. For a specific implementation, refer to the detailed descriptions of step 401 to step 403 in the embodiment shown in FIG. 4. Details are not described herein again.

In a specific implementation, the heartbeat message is a CUSP message.

In a possible design, the CUSP message includes a first field and a second field, where the first field indicates that a message type of the CUSP message is the heartbeat message, and the second field indicates master/backup states of the first control unit and the second control unit.

In a possible design, the second field is a priority of the first control unit.

In a possible design, the CUSP message further includes a third field, and the third field indicates a subscriber unit controlled by the first control unit when the first control unit is a master control unit.

In a possible design, the third field is an identifier, of the subscriber unit, corresponding to the master/backup state.

The network device may be configured to perform the foregoing master/backup negotiation method, and therefore can achieve the same effect as the foregoing master/backup negotiation method. Details are not described herein again.

An embodiment of this application further provides a computer-readable storage medium. All or some of the procedures in the foregoing method embodiment may be completed by a computer program instructing relevant hardware. The program may be stored in the foregoing computer-readable storage medium. When the program is executed, the procedures in the foregoing method embodiment may be included. For example, the computer-readable storage medium may be the subscriber unit in any one of the foregoing embodiments, for example, an internal storage unit including a data transmitting end and/or a data receiving end, for example, a hard disk or a memory of the subscriber unit. The foregoing computer-readable storage medium may also be an external storage device of the foregoing subscriber unit, for example, a plug-in hard disk, a smart media card (SMC), or a secure digital (SD) card, and a flash card that are configured on the foregoing subscriber unit. Further, the computer-readable storage medium may further include both an internal storage unit and an external storage device of the subscriber unit. The computer-readable storage medium is configured to store the computer program and other programs and data required by the subscriber unit. The computer-readable storage medium may be further configured to temporarily store data that has been output or is to be output.

An embodiment of this application further provides computer instructions. All or some of the procedures in the foregoing method embodiment may be completed by a computer program instructing relevant hardware (for example, a computer, a processor, a network device, and a terminal). The program may be stored in the foregoing computer-readable storage medium.

An embodiment of this application further provides a chip system. The chip system may include a chip, or may include a chip and another discrete component. This is not limited. The chip system includes a processor and a transceiver. All or some of the procedures in the foregoing method embodiment may be completed by the chip system. For example, the chip system may be configured to implement the function executed by the subscriber unit in the foregoing method embodiment, or implement the function executed by the first control unit or the second control unit in the foregoing method embodiment.

In a possible design, the chip system further includes a memory. The memory is configured to store program instructions and/or data. When the chip system runs, the processor executes the program instructions stored in the memory, so that the chip system executes the function executed by the subscriber unit in the foregoing method embodiment, executes the function executed by the first control unit in the foregoing method embodiment, or the function executed by the second control unit in the foregoing method embodiment.

In embodiments of this application, the processor may be a general-purpose processor, a digital signal processor, an application-specific integrated circuit, a field programmable gate array or another programmable logic device, a discrete gate or transistor logic device, or a discrete hardware component. The processor can implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware and software modules in the processor.

In embodiments of this application, the memory may be a nonvolatile memory, such as a hard disk drive (HDD) or a solid-state drive (SSD), or may be a volatile memory, such as a random access memory (RAM). The memory is any other medium that can be used to carry or store expected program code in a form of an instruction or a data structure and that can be accessed by a computer, but is not limited thereto. Alternatively, the memory in embodiments of this application may be a circuit or any other apparatus that can implement a storage function, and is configured to store instructions and/or data.

It should be noted that in the specification, claims, and accompanying drawings of this application, the terms "include", "have", and any variation thereof are intended to cover non-exclusive inclusions. For example, a process, a method, a system, a product, or a device that includes a series of steps or units is not limited to the listed steps or units, but optionally further includes other unlisted steps or units, or optionally further includes other inherent steps or units of the process, the method, the product, or the device.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit. When the integrated unit is implemented in the form of a software functional unit and sold or used as an independent product, the integrated unit may be stored in a readable storage medium. Based on this understanding, the technical solutions in embodiments of this application essentially, or some of the technical solutions that contribute to the conventional technology, or all or some of the technical solutions may be embodied in a form of a software product. The software product is stored in a storage medium, and includes several instructions used to enable a device, for example, a single-chip microcomputer, a chip, or a processor to perform all or some of the steps of the methods in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A subscriber unit in a network system, the subscriber unit comprising:
   one or more memories configured to store instructions; and
   one or more processors coupled to the one or more memories and configured to execute the instructions to cause the subscriber unit to:
      periodically receive a heartbeat message from a first control unit in the network system according to a preset period; and
      send each heartbeat message received from the first control unit to a second control unit in the network system, wherein the heartbeat messages are used by the second control unit to make a master/backup decision relating to the first control unit and the second control unit based on whether a heartbeat message is received by the second control unit in a corresponding period; and
   wherein the first control unit has a first communication connection to at least one subscriber unit including the subscriber unit, and the second control unit has a second communication connection to the at least one subscriber unit;
   wherein the first control unit and the second control unit each comprise at least one of a control plane (CP), a virtual control plane (VCP), or a virtual broadband network gateway control plane (VBNG-CP), and the subscriber unit comprises at least one of a user plane (UP), a virtual user plane (VUP), or a virtual broadband network gateway user plane (VBNG-UP);
   wherein each heartbeat message is a control plane and user plane separation protocol (CUSP) message;
   wherein each CUSP message corresponding to the heartbeat messages comprises: a first field and a second field, wherein the first field of each CUSP message corresponding to the heartbeat messages indicates that a message type of the corresponding CUSP message is the heartbeat message type, and the second field of each CUSP message corresponding to the heartbeat messages indicates master/backup states of the first control unit and the second control unit; and
   wherein each CUSP message corresponding to the heartbeat messages further comprises a third field, wherein the third field of each CUSP message corresponding to the heartbeat messages indicates a user group corresponding to the master/backup states.

2. The subscriber unit according to claim 1, wherein the second field of each CUSP message corresponding to the heartbeat messages carries a priority of the first control unit.

3. The subscriber unit according to claim 1, wherein the third field of each CUSP message corresponding to the heartbeat messages carries an identifier of the user group.

4. A method, applied to at least one subscriber unit in a network system, the method comprising:
   periodically receiving, by the at least one subscriber unit, a heartbeat message according to a preset period from a first control unit in the network system; and
   sending, by the at least one subscriber unit, each heartbeat message received from the first control unit to a second control unit in the network system, wherein the heartbeat messages are used by the second control unit to make a master/backup decision relating to the first control unit and the second control unit based on whether a heartbeat message is received by the second control unit in a corresponding period; and wherein the first control unit has a first communication connection to the at least one subscriber unit, and the second control unit has a second communication connection to the at least one subscriber unit;

wherein each heartbeat message is a control plane and user plane separation protocol (CUSP) message;

wherein each CUSP message corresponding to the heartbeat messages comprises: a first field and a second field, wherein the first field of each CUSP message corresponding to the heartbeat messages indicates that a message type of the corresponding CUSP message is the heartbeat message type, and the second field of each CUSP message corresponding to the heartbeat messages indicates master/backup states of the first control unit and the second control unit; and wherein each CUSP message corresponding to the heartbeat messages further comprises a third field, wherein the third field of each CUSP message corresponding to the heartbeat messages indicates a user group corresponding to the master/backup states.

5. The method according to claim 4, wherein the first control unit and the second control unit each comprise at least one of a control plane (CP), a virtual control plane (VCP), or a virtual broadband network gateway control plane (VBNG-CP); and the subscriber unit comprises at least one of a user plane (UP), a virtual user plane (VUP), or a virtual broadband network gateway user plane (VBNG-UP).

6. The method according to claim 4, wherein the second field of each CUSP message corresponding to the heartbeat messages carries a priority of the first control unit.

7. The method according to claim 4, wherein the third field of each CUSP message corresponding to the heartbeat messages carries an identifier of the user group.

8. A method, applied to a second control unit in a network system, the method comprising:

periodically receiving, by the second control unit, a heartbeat message from a subscriber unit in the network system according to a preset period, wherein the heartbeat messages are sent to the subscriber unit from a first control unit in the network system; and making, by the second control unit, a master/backup decision relating to the first control unit and the second control unit based on whether a heartbeat message is received in a corresponding period; and wherein the first control unit has a first communication connection to the subscriber unit, and the second control unit has a second communication connection to the subscriber unit;

wherein the first control unit and the second control unit each comprise at least one of a control plane (CP), a virtual control plane (VCP), or a virtual broadband network gateway control plane (VBNG-CP); and the subscriber unit comprises at least one of a user plane (UP), a virtual user plane (VUP), or a virtual broadband network gateway user plane (VBNG-UP);

wherein each heartbeat message is a control plane and user plane separation protocol (CUSP) message;

wherein each CUSP message corresponding to the heartbeat messages comprises: a first field and a second field, wherein the first field of each CUSP message corresponding to the heartbeat messages indicates that a message type of the CUSP message is the heartbeat message type, and the second field of each CUSP message corresponding to the heartbeat messages indicates master/backup states of the first control unit and the second control unit; and wherein each CUSP message corresponding to the heartbeat messages further comprises a third field, wherein the third field of each CUSP message corresponding to the heartbeat messages indicates a user group corresponding to the master/backup states.

9. The method according to claim 8, wherein the second field of each CUSP message corresponding to the heartbeat messages carries a priority of the first control unit; and wherein making, by the second control unit, a master/backup decision based on the heartbeat message comprises:

making, by the second control unit, the master/backup decision based on the priority of the first control unit and a priority of the second control unit.

* * * * *